(12) United States Patent
Liu et al.

(10) Patent No.: US 7,674,029 B2
(45) Date of Patent: Mar. 9, 2010

(54) LIGHT GUIDE DEVICE AND LIGHT GUIDE PLATE USING THE SAME

(75) Inventors: Yu-Nan Liu, Kaohsiung (TW); Tzu-Wei Wang, Taoyuan (TW)

(73) Assignee: Lite-On Technology Corporation, Taipei (TW)

( * ) Notice: Subject to any disclaimer, the term of this patent is extended or adjusted under 35 U.S.C. 154(b) by 209 days.

(21) Appl. No.: 11/878,490

(22) Filed: Jul. 25, 2007

(65) Prior Publication Data
US 2008/0049449 A1 Feb. 28, 2008

(30) Foreign Application Priority Data
Aug. 23, 2006 (TW) ............................. 95131028 A

(51) Int. Cl.
*F21V 7/04* (2006.01)
*H01L 33/00* (2006.01)
*H01J 1/62* (2006.01)
(52) U.S. Cl. .................. 362/609; 362/608; 362/612
(58) Field of Classification Search .......... 362/608–613
See application file for complete search history.

(56) References Cited

U.S. PATENT DOCUMENTS

| | | | | |
|---|---|---|---|---|
| 5,876,107 A * | 3/1999 | Parker et al. | ............. | 362/600 |
| 7,134,777 B2 * | 11/2006 | Sung | ............. | 362/609 |
| 7,293,906 B2 * | 11/2007 | Mok et al. | ............. | 362/609 |
| 7,303,324 B2 * | 12/2007 | Yang et al. | ............. | 362/609 |
| 7,470,034 B2 * | 12/2008 | Pang | ............. | 362/29 |
| 2006/0256578 A1 * | 11/2006 | Yang et al. | ............. | 362/609 |
| 2007/0274096 A1 * | 11/2007 | Chew et al. | ............. | 362/609 |

FOREIGN PATENT DOCUMENTS

JP 2000-321440 A 11/2000

* cited by examiner

*Primary Examiner*—Stephen F Husar
*Assistant Examiner*—James W Cranson
(74) *Attorney, Agent, or Firm*—Bacon & Thomas, PLLC

(57) ABSTRACT

A light guide device and a light guide plate using the same are provided. The light guide device has a first surface, a second surface, and a bottom surface. The first surface, the second surface, and the bottom surface define the internal part of the light guide device. The bottom surface has a cavity. When a light source in the cavity generates light, the light from the internal part of the light guide device is emitted via the first surface.

14 Claims, 5 Drawing Sheets

LIGHT GUIDE DEVICE AND LIGHT GUIDE PLATE USING THE SAME

This application claims the benefit of Taiwan application Serial No. 95131028, filed Aug. 23, 2006, the subject matter of which is incorporated herein by reference.

BACKGROUND OF THE INVENTION

1. Field of the Invention

The invention relates in general to a light guide device, and more particularly to a light guide device for increasing light utilization rate and a light guide plate using the same.

2. Description of the Related Art

Please referring to FIG. 1, part of a conventional backlight module is illustrated. The backlight module 100, such as a side-light type backlight module, includes a light source 110 and a light guide plate 120. The light guide plate 120 is generally a wedge plate or a flat plate and has a light incident surface R1 and a light emitting surface R2. The light source 110, such as a light emitting diode (LED) light bar, is disposed near the light incident surface R1 for generating light. The light enters the light guide plate 120 through the light incident surface R1. Then, the light is emitted out from the light guide plate 120 through the light emitting surface R2 and becomes a surface light source. Furthermore, several optical sheets (not shown in drawings) are disposed between the light guide plate 120 and a display panel (not shown in drawings) for uniformizing the light from the light emitting surface R2 and increasing the luminance. As a result, the backlight module for the display panel is improved.

However, when the thickness of the light guide plate 120 is reduced, the light generated by the light source 110 can not effectively enter the light guide plate 120, which means that the light received by the light incident surface R1 is decreased. Therefore, the thickness of the light guide plate 120 can not be reduced randomly. Generally speaking, the light incident surface R1 has to be corresponding to the field that the light projected onto, as shown in FIG. 1. Furthermore, when the light source 110 is a LED light bar, several packages with LED chips are arranged at the same intervals on the light bar. Each package has a light emitting range of 120° substantially. As a result, the space near the light bar and between two adjacent packages is dark. Accordingly, the area (the dotted area in FIG. 1) of the light emitting surface R2 adjacent to the light incident surface R1 becomes relatively dark. In other words, the surface light source emitted from the light emitting surface R2 is non-uniform. In order to solve this problem, the distance between the light source 110 and the light incident surface R1 is increased. However, the luminance of the light emitting surface R2 is lowered, and the arrangement of other components, such as a plastic frame or a lamp holder, is limited. Besides, the light received by the light incident surface R1 is reduced because light leakage occurs on a side of the non light-emitting region of the package.

Therefore, it is very important to solve the above problems for reducing the volume of the display and increasing the light utilization rate.

SUMMARY OF THE INVENTION

The invention is directed to a light guide device and a light guide plate using the same. A cavity for containing an embedded light source and the relative reflection treatment are for increasing the light utilization rate and enlarging the application field of the light guide device of the present invention. Furthermore, the light guide plate of the present invention is thinner than the conventional one, and the manufacturing cost of the backlight module using the light guide plate of the present invention is reduced.

According to the present invention, a light guide device having a first surface, a second surface and a bottom surface is provided. The first surface, the second surface and the bottom surface define an internal part of the light guide device. A cavity is formed on the bottom surface. When a light source positioned in the cavity generates light, the light is emitted through the first surface from the internal part of the light guide device.

According to the present invention, a light guide plate including a main body and a light guide device is provided. The main body has a light emitting surface and a side surface connected to the light emitting surface. The light guide device is disposed on the side surface and has a surface and a bottom surface. The bottom surface, the surface and the side surface define an internal part of the light guide device. A cavity is formed on the bottom surface. When a light source positioned in the cavity generates light, the light is emitted into the main body from the internal part of the light guide plate. Also, the light is emitted out the light guide plate through the light emitting surface.

The invention will become apparent from the following detailed description of the preferred but non-limiting embodiments. The following description is made with reference to the accompanying drawings.

DETAILED DESCRIPTION OF THE INVENTION

First Embodiment

Figure 1:
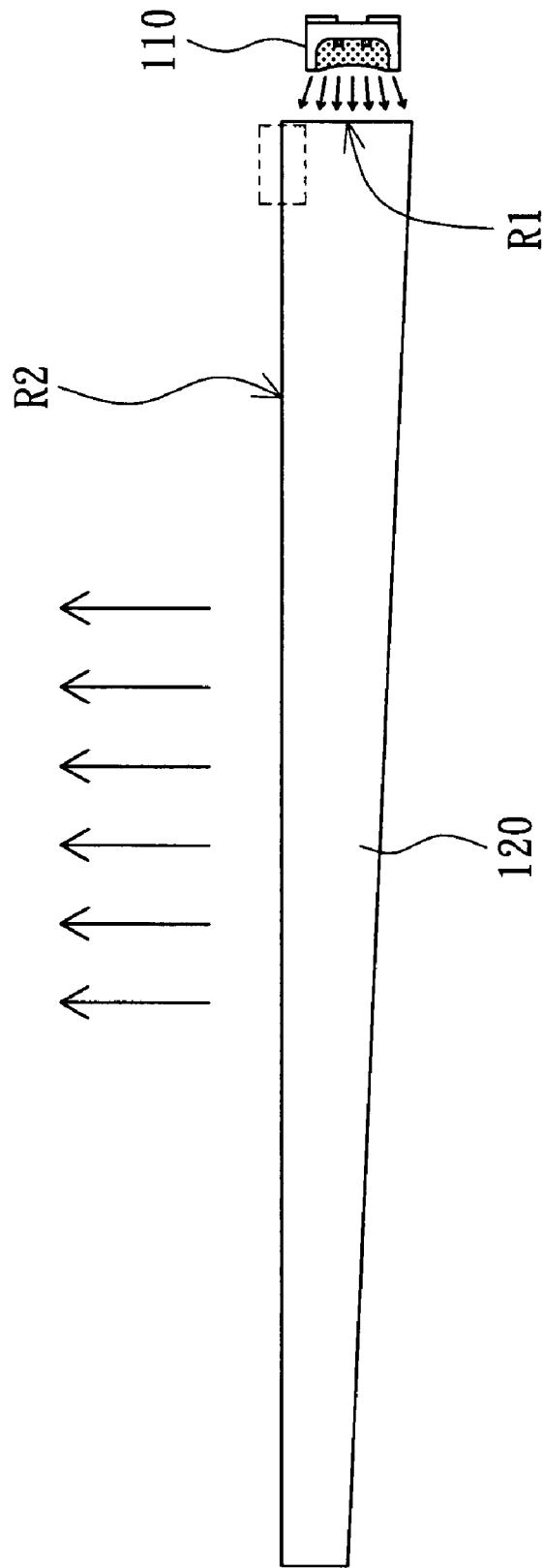
FIG. 1 (Prior Art) shows part of a conventional backlight module.
Figure 2:
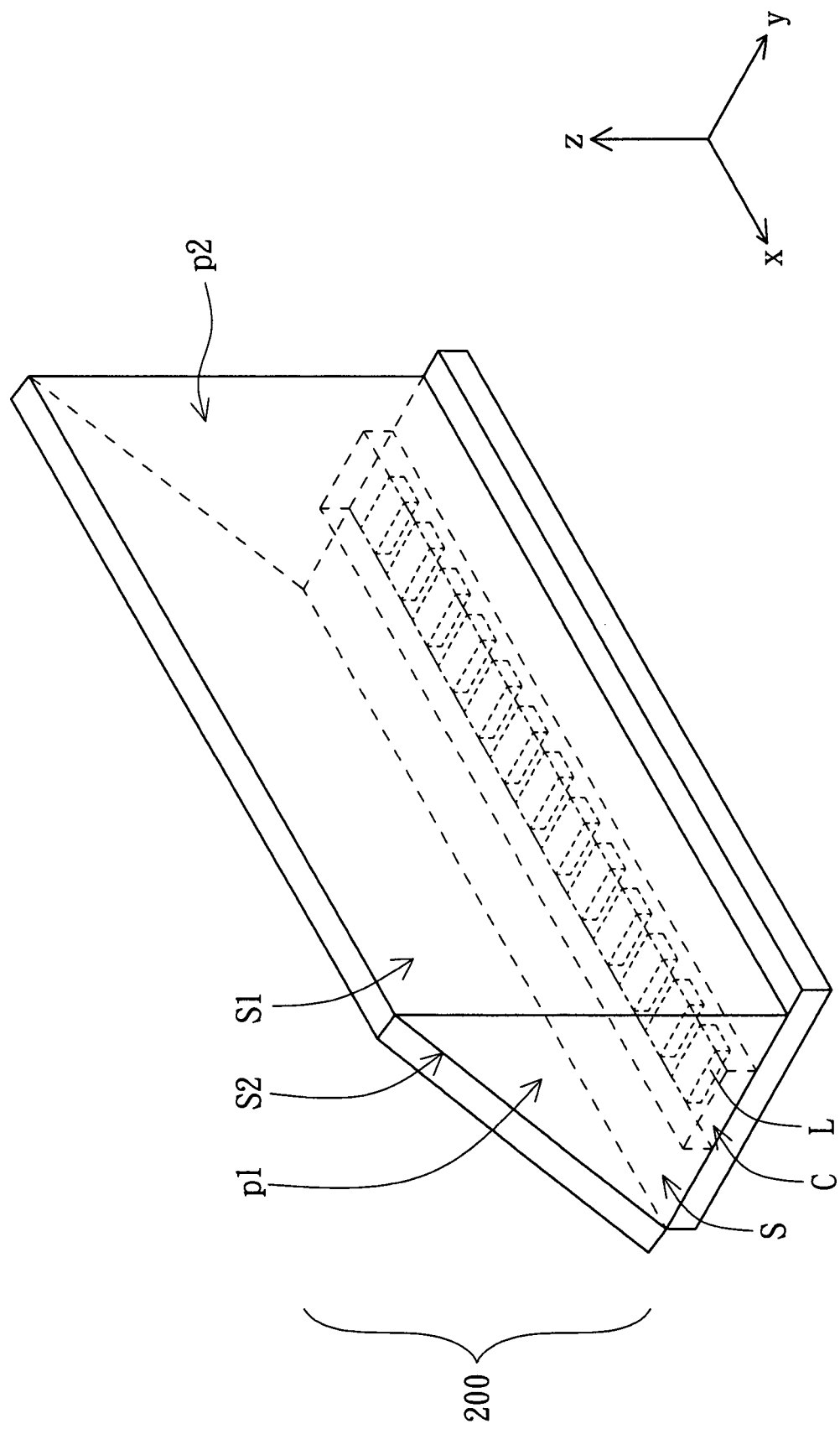
FIG. 2 illustrates a light guide device with an embedded light source according to a first embodiment of the present invention.

Please referring to FIG. 2, a light guide device with an embedded light source according to a first embodiment of the present invention is illustrated. In the first embodiment, a light guide device 200 is substantially a column (such as a triangular prism in FIG. 2) and has a first surface S1 (parallel to the x-z plane), a second surface S2, a bottom surface S (parallel to the x-y plane) and two side surfaces p1 and p2 intersecting the above three planes. Any two of the first surface S1, the second surface S2 and the bottom surface S connect together. Also, the first surface S1, the second surface S2 and the bottom surface S define an internal part of the light guide device 200. In other words, the internal part is enclosed by the three surfaces.

Furthermore, the bottom surface S has a cavity C formed thereon for containing the light source L. In the first embodiment, the light source L is a light emitting diode (LED) assembly as an example. The LED packages are arranged on the LED light bar. Moreover, the cavity C has a rectangular cross-section for containing the LED package. The bottom surface S is attached to a carrier (PCB) of the light bar. For example, the bottom surface S is adhered to the carrier through a double-sided adhesive tape. Besides, the cavity C connects the side surfaces p1 and p2, so that a connection line is preferably disposed in the cavity C. For example, the connecting line is for connecting the light source L and a driver circuit of the light source L. The number and the shape of the cavity C are adjustable according to the light source L. In other embodiments, the light source L is a cold cathode fluorescent lamp (CCFL) for example. The cavity C preferably has a cross-section with a circular arc. As a result, the light source L is embedded inside the light guide device 200 through the cavity C.

Figure 3:
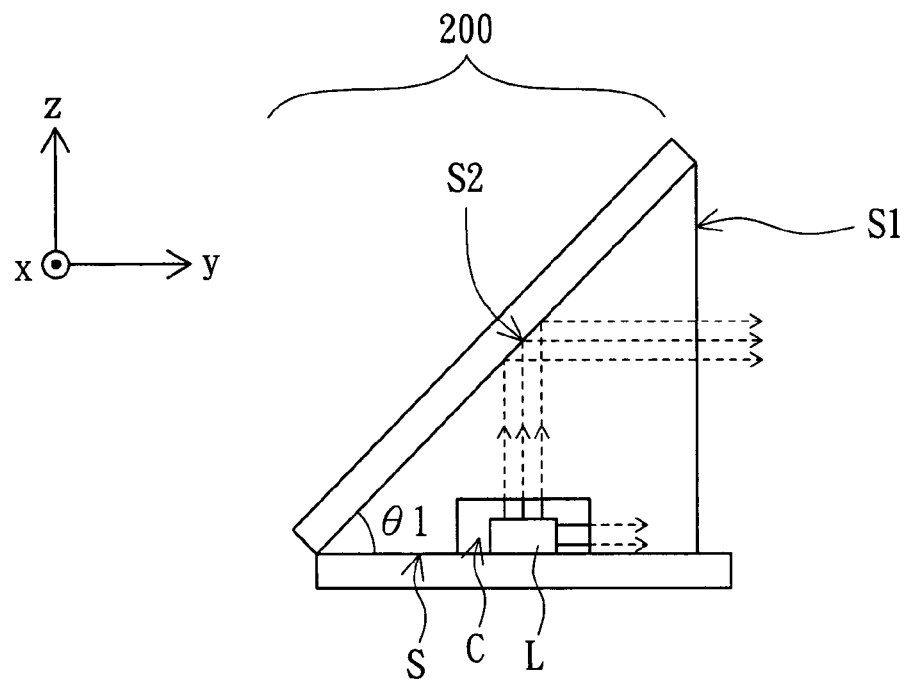
FIG. 3 is a lateral view of FIG. 2.

Please referring to FIG. 3, a lateral view of FIG. 2 is illustrated. In the first embodiment, an acute angle θ1 (preferably equal to 45°) is between the second surface S and the bottom surface S, and the first surface S1 is substantially perpendicular to the bottom surface S. Furthermore, the two side surfaces p1 and p2, the second surface S2 and the bottom surface S are all coated with reflective material or attached to reflection sheets. Or, a surface treatment is performed on those surfaces for high reflection. As shown in FIG. 3, when the light source in the cavity C generates light, the light is emitted toward all surfaces of the light guide device 200 from the internal part of the light guide device 200. Through the above-described reflection treatment, substantially all of the light is emitted out the light guide device 200 through the first surface S1.

Figure 4:
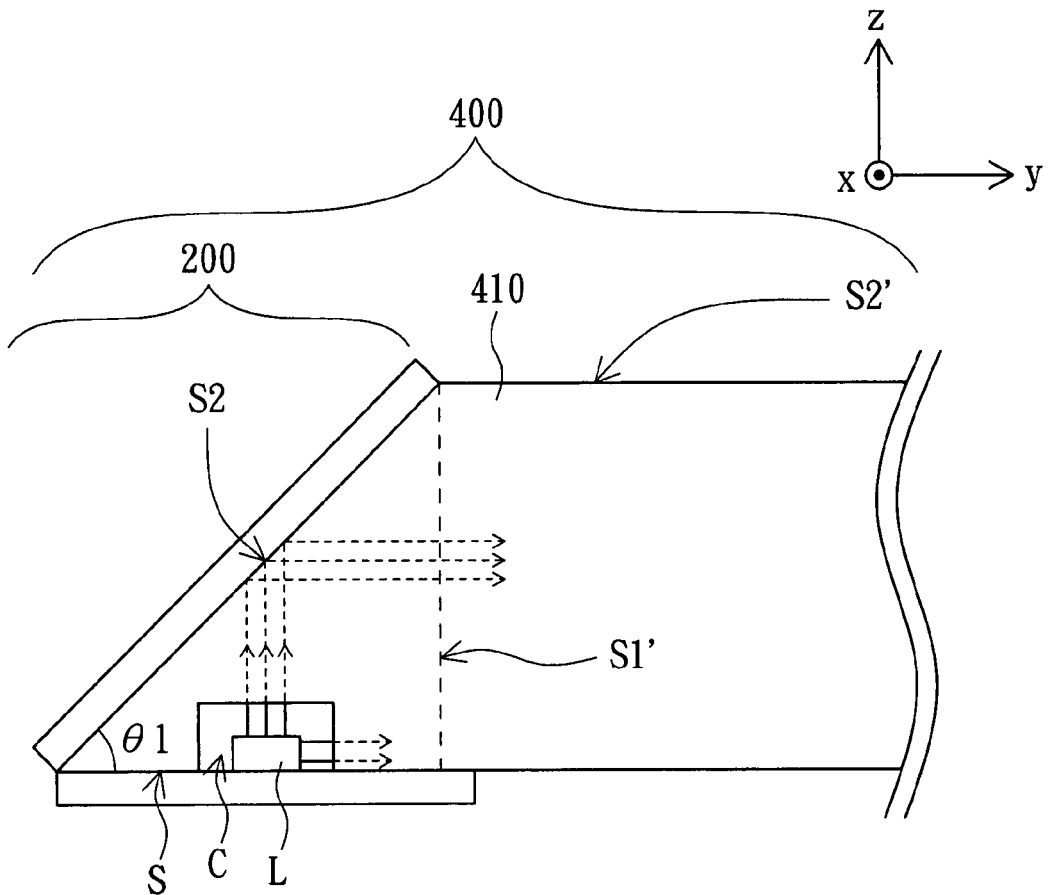
FIG. 4 shows a light guide plate using the light guide device in FIG. 2.

Please referring to FIG. 4, a light guide plate using the light guide device 200 is illustrated. FIG. 4 only shows part of the light guide plate adjacent to the light guide device 200. The light guide plate 400 includes a main body 410 and the light guide device 200. The main body 410 is substantially the same as the conventional one. A side surface S1' of the main body 410 is equivalent to a conventional light incident surface, for receiving light from of the light guide device 200 disposed on the side surface S1'. Also, the main body 410 guides the light toward a light emitting surface S2' which intersects the side surface S1', so that the light is emitted out as a surface light source. Preferably, the main body 410 and the light guide device 200 are formed integrally. In other words, the side surface S1' or the first surface S1 are structural definitions instead of real interfaces. As a result, light loss in medium is reduced, and the yield rate is increased. Compared to the conventional light guide plate, the light guide plate 400 has higher light utilization rate through the embedded light source L of the light guide device 200 and the relative reflection treatment. The light leakage on the side of the non light-emitting region is reduced, as shown in FIG. 4. Also, through the light guide device 200, there is no need to increase the distance between the light source 110 and the main body 410. As a result, the luminance of the light emitting surface S2' becomes more uniform compared to the conventional one.

Second Embodiment

Figure 5:
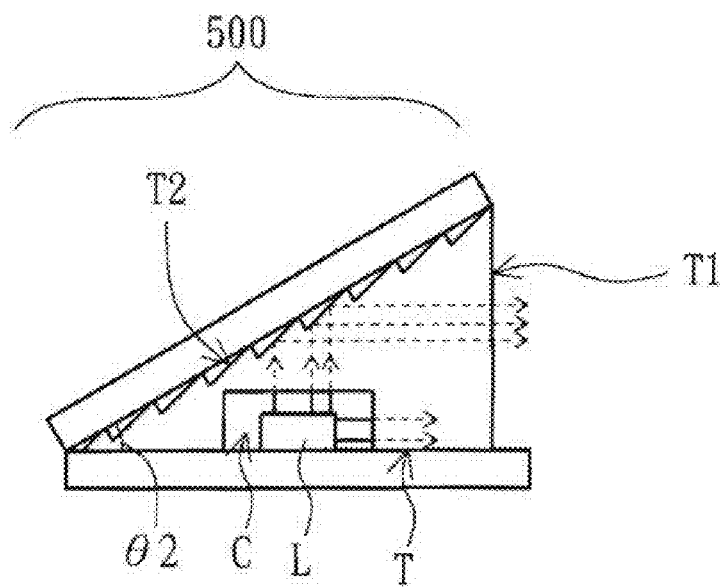
FIG. 5 is a lateral view of a light guide device with an embedded light source according to a second embodiment of the present invention.

Please referring to FIG. 5, a lateral view of a light guide device with an embedded light source according to a second embodiment of the present invention is illustrated. The difference between the second embodiment and the first embodiment is that the second surface T2 of the light guide device 500 further has a V-cut structure. Preferably, the angle between a surface of the V-cut structure and the bottom surface is substantially equal to 45°. Accordingly, the surface of the V-cut structure of the second surface T2 has similar reflection effect as the first embodiment. The acute angle θ2 between the second surface T2 and the bottom surface T is adjustable. For example, the acute angle θ2 is preferably equal to 30°, so that the height of the first surface T1 is less than that of the first surface S1 in FIG. 3. When applied to the light guide plate, the thickness of the main body of the light guide plate is reduced effectively. Therefore, the backlight module and the display using the same are more compact.

Third Embodiment

Figure 6:
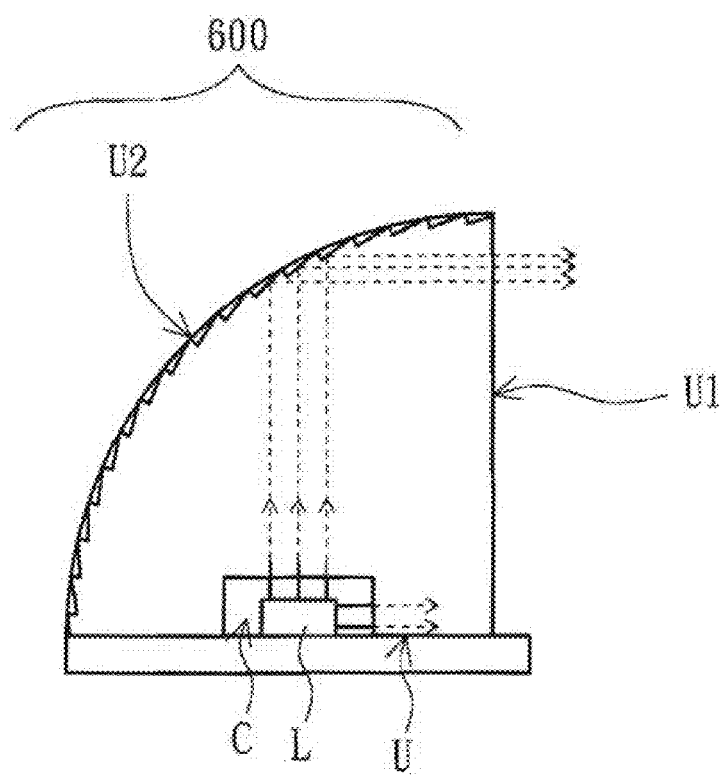
FIG. 6 is a lateral view of a light guide device with an embedded light source according to a third embodiment of the present invention.

Please referring to FIG. 6, a lateral view of a light guide device with an embedded light source according to a third embodiment of the present invention is illustrated. In the third embodiment, the second surface U2 of the light guide device 600 is an arc surface, which is adjustable according to the type of the light source L or the predetermined height of the first surface U1. For example, the arc surface is part of a circular arc surface or a parabolic surface. The arc surface is part of the circular arc surface in FIG. 6 as an example. Furthermore, a V-cut structure is preferably formed on the second surface U2.

Fourth Embodiment

Figure 7:
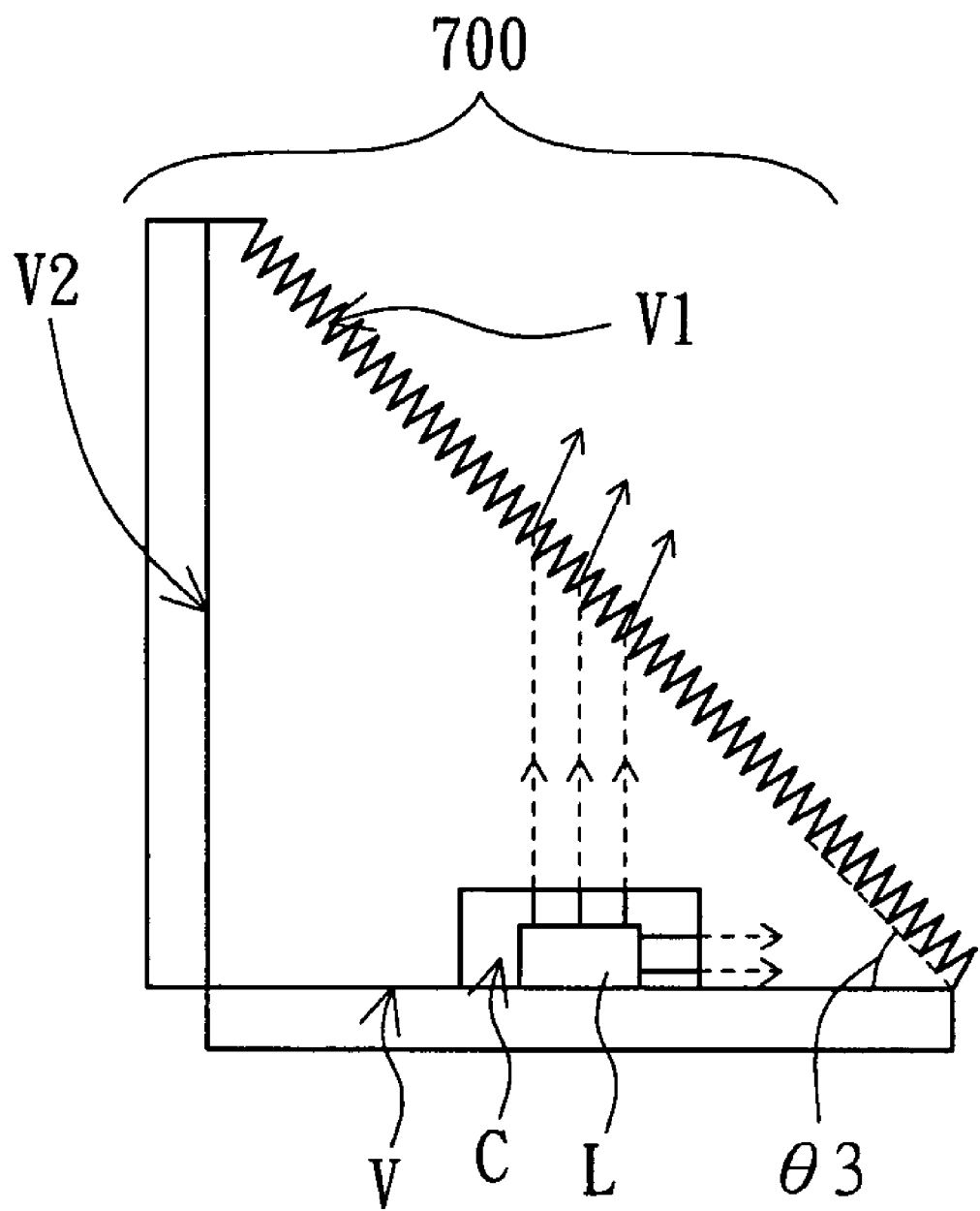
FIG. 7 is a lateral view of a light guide device with an embedded light source according to a fourth embodiment of the present invention.

Please referring to FIG. 7, a lateral view of a light guide device with an embedded light source according to a fourth embodiment of the present invention is illustrated. In the fourth embodiment, a V-cut structure is formed on the first surface V1. An acute angle θ3 (such as 45°) is between the first surface V1 and the bottom surface V. The second surface V2 is substantially perpendicular to the bottom surface V. Light is emitted out through the first surface V1, and the V-cut structure increases light quantity within a specific range of angle. In other words, the light emitted from the light guide device 700 transmits toward a specific direction substantially. Accordingly, the application field of the light guide device 700 is enlarged, and the demand of some electronic devices using LED or CCFL can be satisfied.

Any one who has ordinary skill in the field of the present invention can understand that the present invention is not limited thereto. In addition to being applied to the light guide plate of the backlight module, the light guide device can be used alone with a light source and applied to other electronic devices with the light sources. For example, the light guide device of the present invention can be applied to a scanner. Moreover, the light guide device is preferably made of general plastic material, such as poly carbonate (PC), poly methyl methacrylate (PMMA), MS resin, polyethylene terephthalate (PET) and glass. Also, the direction, depth and cross-sectional size of the V-cut structure are adjustable according to the practical optical properties. In the present invention, the light generated by the light source is concentrated toward a surface from the internal part of the light guide device by using a cavity for containing the light guide device and reflection treatment of each surface. As a result, light utilization rate is increased. The present invention encompasses all light guide devices with the above properties.

In the light guide device and the light guide plate using the same according to the above embodiments of the present invention, the light source embedded in the cavity and relative reflection treatment are for increasing light utilization rate and enlarging the application field. Compared to the conventional one, the light guide plate of the present invention is thinner and more compact. When the light source is embedded in the light guide device, there is no need to use the conventional fixing structure, such as a lamp holder. Therefore, the manufacturing cost and assembling time of the backlight module are reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light guide device comprising:
a first surface and a second surface, wherein the second surface is a flat surface and a V-cut structure is formed on the second surface; and
a bottom surface with a cavity, wherein an acute angle is formed between the bottom surface and the second surface, the first surface, the second surface and the bottom surface define an internal part of the light guide device, a light source positioned in the cavity generating light emitting out through the first surface from the internal part of the light guide device.

2. The device according to claim 1, wherein the light source is a lamp or a light emitting diode (LED) assembly.

3. The device according to claim 1, wherein the light guide device is made of poly carbonate (PC), poly methyl methacrylate (PMMA), Ms resin or polyethylene terephthalate (PET).

4. The device according to claim 1, being substantially a column, wherein any two of the first surface, the second surface and the bottom surface connect together.

5. The device according to claim 1 further comprising two side surfaces intersecting the first surface, the second surface and the bottom surface, each of the side surfaces coated with reflective material or attached to a reflection sheet, for reflecting part of the light incident to the side surfaces back to the internal part of the light guide device.

6. The device according to claim 1, wherein the second surface is coated with a reflective material or attached to a reflection sheet.

7. The device according to claim 1, wherein the acute angle is substantially equal to 45°.

8. The device according to claim 1, wherein the first surface is substantially perpendicular to the bottom surface.

9. A light guide plate comprising:
a main body comprising a light emitting surface and a first surface; and
a light guide device disposed on the first surface and comprising:
a second surface, wherein the second surface is a flat surface and a V-cut structure is formed on the second surface; and
a bottom surface with a cavity, wherein an acute angle is formed between the bottom surface and the second surface, the bottom surface, the first surface and the second surface define an internal part of the light guide device, a light source positioned in the cavity generating light emitted into the main body from the internal part of the light guide plate through the first surface and emitted out the light guide plate through the light emitting surface.

10. The light guide plate according to claim 9, wherein the main body and the light guide device are formed integrally.

11. The light guide plate according to claim 9, wherein the light source is a lamp or a light emitting diode (LED) light bar.

12. The light guide plate according to claim 9, wherein the light guide device is made of poly carbonate (PC), poly methyl methacrylate (PMMA), MS resin or polyethylene terephthalate (PET).

13. The light guide plate according to claim 9, wherein the second surface is coated with reflective material or attached to a reflection sheet.

14. The light guide plate according to claim 9, wherein the acute angle is substantially equal to 45°.

* * * * *